(12) United States Patent
Chen

(10) Patent No.: US 7,813,645 B2
(45) Date of Patent: Oct. 12, 2010

(54) INFRARED LIGHT EMITTING AND RECEIVING SYSTEM

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 840 days.

(21) Appl. No.: 11/617,053

(22) Filed: Dec. 28, 2006

(65) Prior Publication Data
US 2008/0089694 A1   Apr. 17, 2008

(30) Foreign Application Priority Data
Oct. 17, 2006   (CN) .................. 2006 1 0201009

(51) Int. Cl.
*H04B 10/00* (2006.01)
*G02F 1/01* (2006.01)
*H05K 7/20* (2006.01)
*F21V 7/00* (2006.01)

(52) U.S. Cl. .................. 398/130; 398/119; 398/140; 250/330; 361/704; 361/717; 362/294

(58) Field of Classification Search .................. 398/130, 398/118; 165/250
See application file for complete search history.

(56) References Cited

U.S. PATENT DOCUMENTS

| | | | | |
|---|---|---|---|---|
| 5,737,119 A | * | 4/1998 | Mladjan et al. | 359/353 |
| 5,966,225 A | * | 10/1999 | Taglione et al. | 398/96 |
| 2003/0138132 A1 | * | 7/2003 | Stam et al. | 382/104 |
| 2004/0189218 A1 | * | 9/2004 | Leong et al. | 315/291 |
| 2004/0243120 A1 | * | 12/2004 | Orszulak et al. | 606/34 |
| 2005/0092467 A1 | * | 5/2005 | Lin et al. | 165/104.26 |
| 2005/0231983 A1 | * | 10/2005 | Dahm | 362/800 |
| 2006/0228103 A1 | * | 10/2006 | Go | 396/268 |
| 2007/0025085 A1 | * | 2/2007 | Chang | 361/704 |
| 2007/0053166 A1 | * | 3/2007 | Hwang et al. | 361/717 |

* cited by examiner

*Primary Examiner*—Ken N Vanderpuye
*Assistant Examiner*—Oommen Jacob
(74) *Attorney, Agent, or Firm*—Jeffrey T. Knapp

(57) ABSTRACT

An infrared light emitting and receiving system (10) includes an infrared light emitting device (100), and an infrared light receiving device (200). The infrared light emitting device including a heat sink (102), at least a heat pipe (104), a metallic plate (106), and at least an infrared light source (108) in thermal connections with one other in that order. The infrared light receiving device receives infrared light beams (300) emitted from the infrared light emitting device, the infrared light receiving device comprising a lens barrel (202), at least one lens (204) received in the lens barrel, an infrared passband filter (220) formed on the at least one lens, a sensor housing (212) coupled to the lens barrel, and an image sensor (230) received in the sensor housing.

14 Claims, 2 Drawing Sheets

INFRARED LIGHT EMITTING AND RECEIVING SYSTEM

BACKGROUND OF THE INVENTION

1. Field of the Invention

The present invention relates to wireless transmitting systems and, more particularly, to an infrared light emitting and receiving system.

2. Description of Related Art

In the past, various electrical equipment had to be connected by wires for controlling and/or transmitting data. However, when wires are used for connecting more space is used by equipment. Moreover, usage of the electrical equipment is troublesome due to twisting wires. Therefore, a wireless transmitting system, such as an infrared light emitting and receiving system, is introduced into the equipment.

A conventional infrared light emitting and receiving system includes an infrared light receiving device and an infrared light emitting device. The infrared light emitting device includes a light source for emitting infrared light beams as an optical signal. The infrared light receiving device receives the optical signal and transforms the optical signal into an electrical signal that can be identified by the electrical equipment.

Generally, the light source is an infrared light-emitting diode (IR-LED) used in the infrared light emitting and receiving system. However, working IR-LEDs generate a large amount of heat. If heat can't be dissipated efficiently operating life of the IR-LED is reduced.

What is needed, therefore, is to provide an infrared light emitting and receiving system with satisfactory heat dissipation.

SUMMARY OF THE INVENTION

In a preferred embodiment, an infrared light emitting and receiving system includes an infrared light emitting device, and an infrared light receiving device. The infrared light emitting device including a heat sink, at least a heat pipe, a metallic plate, and at least an infrared light source thermally connecting to each other in that order. The infrared light receiving device receives infrared light beams emitted from the infrared light emitting device, the infrared light receiving device comprising a lens barrel, at least one lens received in the lens barrel, an infrared passband filter formed on the at least one lens, a sensor housing coupled to the lens barrel, and an image sensor received in the sensor housing.

Advantages and novel features will become more apparent from the following detailed description of the present infrared light emitting and receiving system, when taken in conjunction with the accompanying drawings.

BRIEF DESCRIPTION OF THE DRAWINGS

Many aspects of the present infrared light emitting and receiving system can be better understood with reference to the following drawings. The components in the drawings are not necessarily drawn to scale, the emphasis instead being placed upon clearly illustrating the principles of the present infrared light emitting and receiving system. Moreover, in the drawings, like reference numerals designate corresponding parts throughout the several views.

Figure 1:
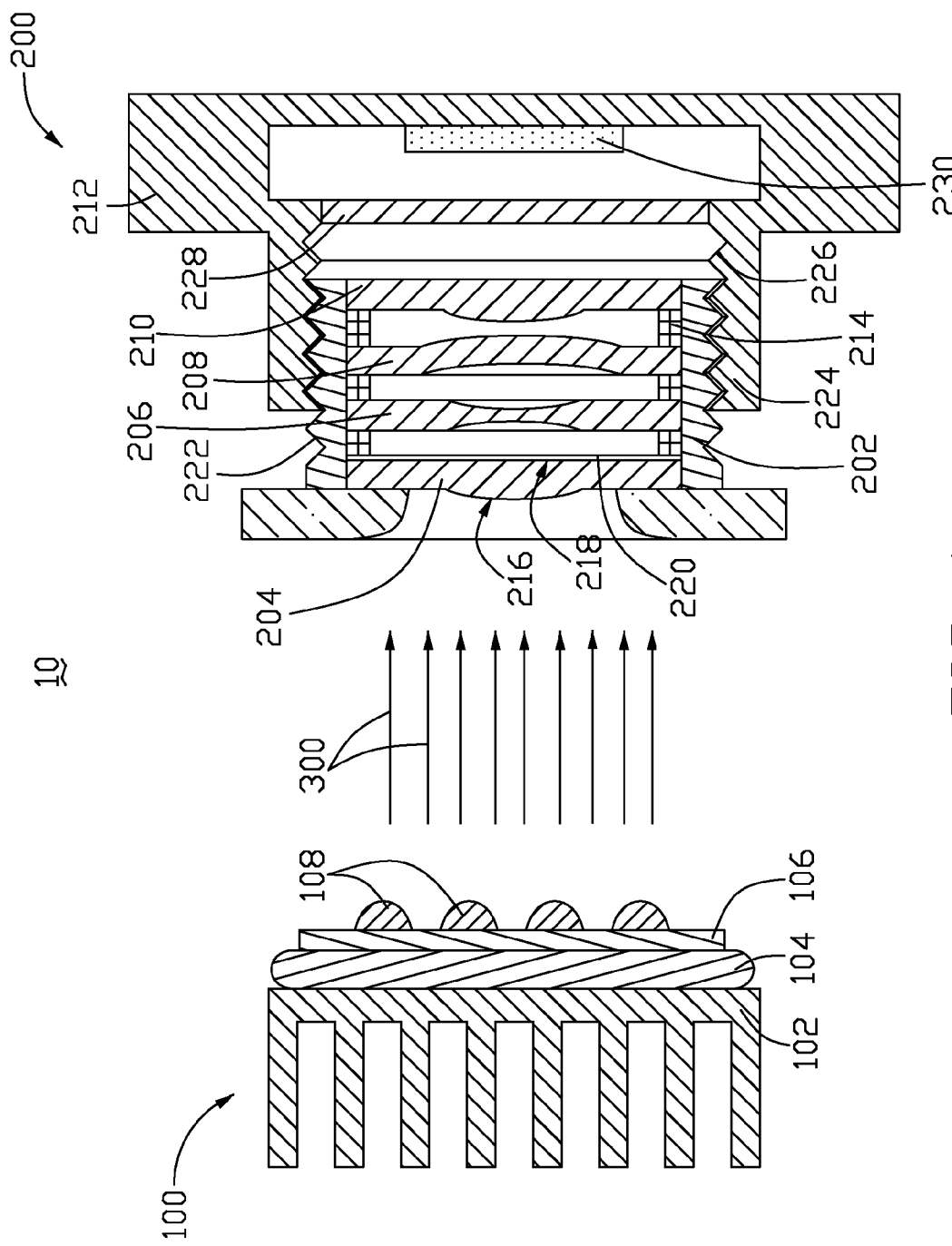
FIG. 1 is a cross-sectional view of an infrared light emitting and receiving system according to a preferred embodiment.

Corresponding reference characters indicate corresponding parts throughout the drawings. The exemplifications set out herein illustrate at least one preferred embodiment of the present infrared light emitting and receiving system, in one form, and such exemplifications are not to be construed as limiting the scope of the invention in any manner.

DETAILED DESCRIPTION OF THE INVENTION

Reference will now be made to the drawings to describe preferred embodiments of the infrared light emitting and receiving system.

Referring to FIG. 1, an infrared light emitting and receiving system 10 according to a preferred embodiment is shown. The infrared light emitting and receiving system 10 includes an infrared light receiving device 200 and an infrared light emitting device 100. Infrared light 300 emitted from the infrared light emitting device 100 is received by the infrared light receiving device 200.

The infrared light emitting device 100 includes a heat sink 102, a plurality of heat pipes 104 formed on the heat sink 102, a metallic plate 106 formed on the heat pipe 104, and a plurality of infrared light sources 108 formed on the metallic plate 106 in thermal connection with one another. For better heat dissipation, a material of the metallic plate 106 can be selected from the group consisting of copper, aluminum and any alloy thereof. A material of the heat sink 102 and a material of wall of the heat pipe 104 may be selected from that group too.

The heat pipe 104 includes a layer of sintered porous copper powder doped with carbon nanotubes coated on an inner surface thereof, and working fluid received therein. Because of excellent heat dissipation performance of copper and carbon nanotubes, heat dissipation efficiency of the heat pipe 104 is high. The heat pipe 104 is formed on a surface of the metallic plate 106 while the plurality of infrared light sources 108 are formed on another surface of the metallic plate 106 and supported by the metallic plate 106. A thickness of the metallic plate 106 can be in the approximate range from 0 millimeters to 3 millimeters. In this preferred embodiment, the plurality of infrared light sources 108 are aluminium gallium arsenide light-emitting diodes (AlGaAs-LEDs) for emitting infrared light. The LEDs may be bullet-type LEDs or surface-mount device LEDs (SMD-LED).

Interfaces between the heat sink 102 and the heat pipe 104, the heat pipe 104 and the metallic plate 106, the metallic plate 106 and the infrared light sources 108 may be coated with a thermal material, such as silica gel, to enhance heat transfer.

The infrared light receiving device 200 includes a lens barrel 202, a plurality of spaced lenses 204, 206, 208, 210 received in the lens barrel 202, an infrared passband filter, a sensor housing 212 coupled to the lens barrel 202, a plurality of spacers 214 and an image sensor 230 received in the sensor housing 212. The spacers 214 are arranged between every two adjacent lenses. A material of the spacers 214 is dark polymer for absorbing light beams so as to avoid light beams reflected by the spacers 214 entering into the image sensor 230. The plurality of spaced lenses 204, 206, 208, 210 may include glass lenses and plastic lenses. Amount of the spaced lenses is in a range from 1 to 10, and should preferable be 3 to 4. In this preferred embodiment, number of the spaced lenses 204, 206, 208, 210 is 4. The lens 204 away from the image sensor 230 includes an aspherical surface 216, an opposite plane surface 218, and the infrared passband filter 220 is formed on the plane surface 218 of the lens 204. Therefore, accuracy of receiving the light of the image sensor 230 is enhanced.

Figure 2:
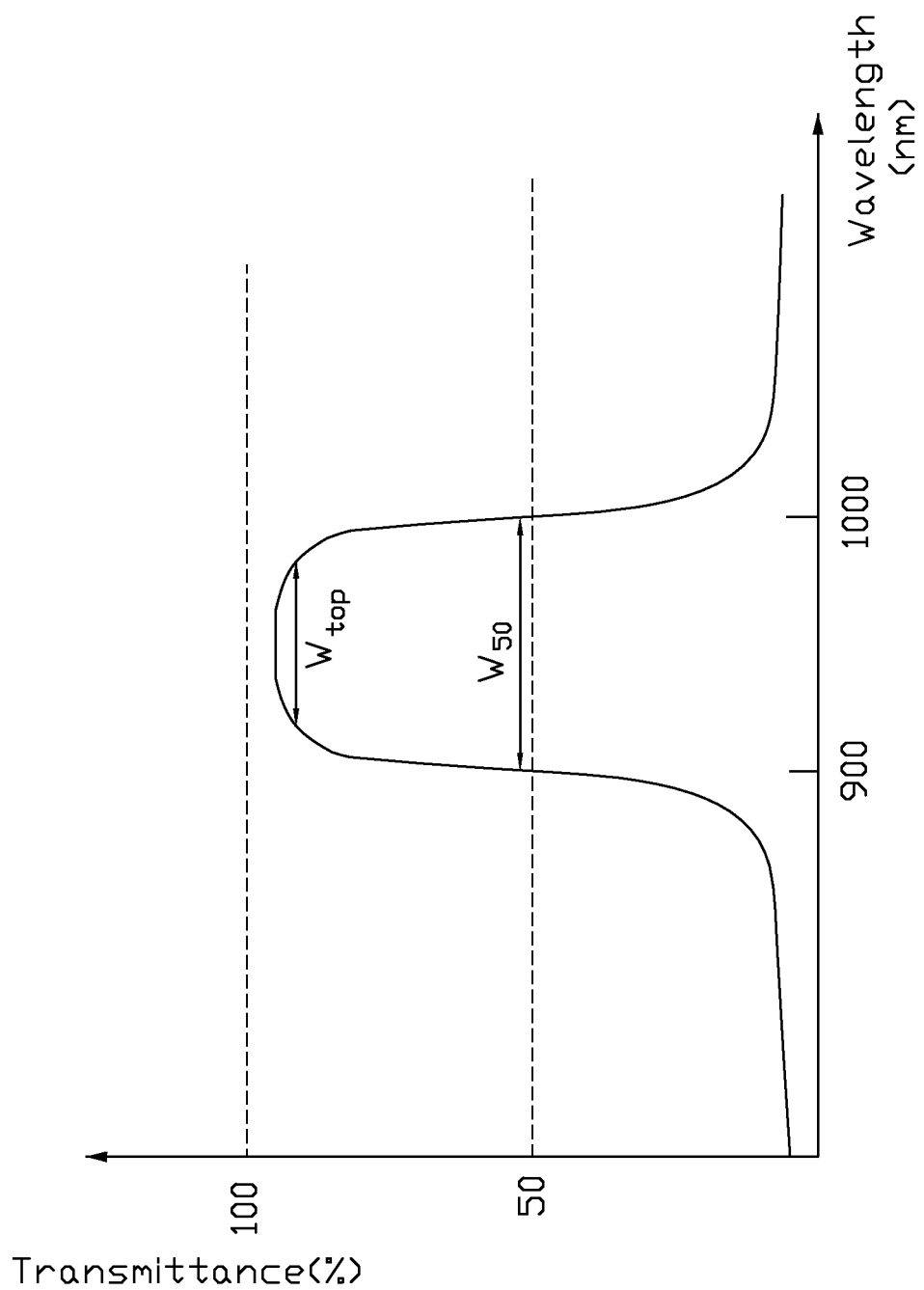
FIG. 2 is a graph illustrating a relationship between transmittance and wavelength of an infrared passband filter according to a preferred embodiment.

Referring to FIG. 2, the filter 220 has very high transmittance of about 90% for light with a wavelength of $W_{top}$ width at 40 nanometers (nm) to 80 nm (preferable 50 nm to 70 nm) and $W_{50}$ width from 60 nm to 200 nm (preferable 80 nm to 120 nm). For the wavelength from 600 nm to 800 nm, the transmittance T is less than 2%. For the wavelength from 1100 nm to 1200 nm, the transmittance T is less than 2%. The infrared passband filter includes a plurality of titanium dioxide ($TiO_2$) layers and a plurality of silicon dioxide ($SiO_2$) layers stacked in alternating fashion one on another. The total number of layers of the infrared passband filter is in an approximate range from 30 to 50.

Referring to FIG. 1 again, the lens barrel 202 has an outer screw thread 222. The sensor housing 212 has a receiving portion 224 with an inner screw thread 226 formed therein. The outer screw thread 222 matches the inner screw thread 226 so that the lens barrel 202 can rotate to focus and zoom. The image sensor 230 can be a complementary metal oxide semiconductor (CMOS) or a charge couple device (CCD) and is co-axial with the lenses 204, 206, 208, 210. The image sensor 230 receives the infrared light beams 300 as an optical signal and transforms the optical signal into an electrical signal.

The infrared light emitting and receiving system 10 further includes an actuator (not shown) and a protective cover 228. Preferably, a material of the protective cover 228 is glass. The actuator is connected to the sensor housing 212 to rotate the sensor housing 212 relative to the screw thread 222, 226 so that the infrared light receiving device 200 can be focused and zoomed. The actuator can be voice coil motor (VCM), stepmotor, piezo-electric actuator, or micro-electro-mechanical system (MEMS) actuator. The protective cover 228 is located next to the image sensor 230 to prevent the image sensor 230 from becoming contaminated by dust or water. Life span of the image sensor 230 is thus elongated.

Since the heat sink 102, and the heat pipe 104 etc. introduced in the infrared light emitting device 100, this ensures that the infrared light emitting and receiving system 10 operate at a normal temperature.

The infrared light emitting device 100 and the infrared light receiving device 200 may be assembled in two separated apparatuses or in same apparatus. If the infrared light emitting device 100 and the infrared light receiving device 200 are assembled in two separated apparatuses, with, for example, the infrared light emitting device 100 in a host and the infrared light receiving device 200 assembled in a remote control, the remote control receives the infrared light beams 300 emitted from the host, and then controls the host based on the received infrared light beams 300. If the infrared light emitting device 100 and the infrared light receiving device 200 are assembled in a single unit, the infrared light receiving device 200 in a first apparatus receives the infrared light beams 300 from the infrared light emitting device 100 in a second apparatus while the infrared light receiving device 200 in the second apparatus receives the infrared light beams 300 emitted from the infrared light emitting device 100 in the first apparatus. By doing this, two apparatuses can communicate with each other.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. An infrared light emitting and receiving system, comprising:
    an infrared light emitting device, the infrared light emitting device comprising a heat sink, at least one heat pipe, a metallic plate, and at least one infrared light source thermally connecting to each other in that order, the at least one heat pipe comprising a layer of sintered porous copper powder doped with carbon nanotubes coated on an inner surface thereof and a working fluid received therein; and
    an infrared light receiving device for receiving infrared light emitted from the infrared light emitting device, the infrared light receiving device comprising:
        a lens barrel,
        at least one lens received in the lens barrel,
        an infrared passband filter formed on the at least one lens,
        a sensor housing coupled to the lens barrel, and
        an image sensor received in the sensor housing.

2. The infrared light emitting and receiving system as claimed in claim 1, wherein the at least one infrared light source is an infrared light emitting diode for emitting infrared light.

3. The infrared light emitting and receiving system as claimed in claim 1, wherein the number of the lenses is in the range from 1 to 10.

4. The infrared light emitting and receiving system as claimed in claim 1, wherein a thickness of the metallic plate is in the approximate range from greater than 0 millimeters to 3 millimeters.

5. The infrared light emitting and receiving system as claimed in claim 1, wherein the image sensor is a complementary metal-oxide semiconductor or a charge-coupled device.

6. The infrared light emitting and receiving system as claimed in claim 1, wherein the lens barrel is threadedly engaged with the sensor housing.

7. The infrared light emitting and receiving system as claimed in claim 3, further comprising a protective cover arranged between the image sensor and the lens next to the image sensor.

8. The infrared light emitting and receiving system as claimed in claim 3, further comprising a plurality of spacers each arranged between two lenses.

9. The infrared light emitting and receiving system as claimed in claim 8, wherein a material of the spacers is dark polymer.

10. The infrared light emitting and receiving system as claimed in claim 2, wherein the infrared light emitting diode is an aluminum gallium arsenide light-emitting diode.

11. The infrared light emitting and receiving system as claimed in claim 1, wherein the infrared passband filter comprises a plurality of titanium dioxide layers and a plurality of silicon dioxide layers alternately stacked one on another.

12. The infrared light emitting and receiving system as claimed in claim 11, wherein the tot number of layers of the infrared passband filter is in a range from 30 to 50.

13. An infrared light emitting and receiving system, comprising:
    an infrared light emitting device, the infrared light emitting device comprising a heat sink, at least one heat pipe, a metallic plate, and at least one infrared light source thermally connecting to each other in that order,
    the at least one heat pipe comprising a first major surface and a second major surface at two directly opposite sides thereof, the heat sink attached to the first major surface and the metallic plate attached to the second major surface; the at least one heat pipe further comprising a layer of sintered porous copper powder doped with carbon nanotubes coated on an inner surface thereof and a working fluid received therein and an infrared light receiving device for receiving infrared light emitted from the infrared light emitting device, the infrared light receiving device comprising:

a lens barrel, at least one lens received in the lens barrel, an infrared pass band filter formed on the at least one lens, a sensor housing coupled to the lens barrel, and an image sensor received in the sensor housing.

14. The infrared light emitting and receiving system as claimed in claim 13, wherein the first major surface is substantially parallel to the second major surface.

\* \* \* \* \*